(12) United States Patent
Karri et al.

(10) Patent No.: US 11,646,024 B2
(45) Date of Patent: May 9, 2023

(54) CREATING A VIRTUAL CONTEXT FOR A VOICE COMMAND

(71) Applicant: International Business Machines Corporation, Armonk, NY (US)

(72) Inventors: Venkata Vara Prasad Karri, Visakhapatnam (IN); Abhishek Jain, Baraut (IN); Sarbajit K. Rakshit, Kolkata (IN); Khader Saheb Shaik, Visakhapatnam (IN); Saraswathi Sailaja Perumalla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 17/316,255

(22) Filed: May 10, 2021

(65) Prior Publication Data
US 2022/0358916 A1  Nov. 10, 2022

(51) Int. Cl.
*G10L 15/22* (2006.01)
*G10L 15/30* (2013.01)
(Continued)

(52) U.S. Cl.
CPC .............. *G10L 15/22* (2013.01); *G06F 3/013* (2013.01); *G10L 15/30* (2013.01); *H04W 4/029* (2018.02); *G10L 2015/223* (2013.01)

(58) Field of Classification Search
CPC ................................ G10L 15/22; H04W 4/029
See application file for complete search history.

(56) References Cited

U.S. PATENT DOCUMENTS

| 8,380,514 B2 | 2/2013 | Bodin et al. |
| 2003/0064716 A1* | 4/2003 | Gailey ............... H04M 3/5322 |
| | | 704/E15.04 |

(Continued)

FOREIGN PATENT DOCUMENTS

| CN | 105700364 A | 6/2016 |
| CN | 105955042 A | 9/2016 |

(Continued)

OTHER PUBLICATIONS

PCT, International Search Report and Written Opinion of The International Searching Authority for Application PCT/IB2022/053194 dated Jul. 7, 2022.

(Continued)

*Primary Examiner* — Ibrahim Siddo
(74) *Attorney, Agent, or Firm* — Patterson + Sheridan, LLP (57) ABSTRACT

A method includes determining a plurality of voice assistance systems located in a plurality of environments and receiving, from a headset of a user, a voice command from the user. The voice command lacks an identifier for a first voice assistance system of the plurality of voice assistance systems in a first environment of the plurality of environments. The method also includes predicting, based on the voice command, a subset of the plurality of voice assistance systems for executing the voice command and communicating, to the headset, images of environments of the plurality of environments in which the subset of the plurality of voice assistance systems are located. The method further includes detecting that the user selected, from the images, an image of the first environment that contains the first voice assistance system and in response, communicating the voice command to the first voice assistance system.

20 Claims, 5 Drawing Sheets

(51) Int. Cl.
*H04W 4/029* (2018.01)
*G06F 3/01* (2006.01)

(56) References Cited

U.S. PATENT DOCUMENTS

| | | |
|---|---|---|
| 2016/0274762 A1 | 9/2016 | Lopez et al. |
| 2016/0274765 A1 | 9/2016 | Rainisto |
| 2019/0378336 A1 | 12/2019 | Werner |
| 2020/0090650 A1 | 3/2020 | Kline et al. |
| 2020/0241829 A1* | 7/2020 | Long ................. G06F 3/16 |
| 2020/0380981 A1* | 12/2020 | Tom ............. G06Q 30/0251 |

FOREIGN PATENT DOCUMENTS

| | | |
|---|---|---|
| CN | 108931924 A | 12/2018 |
| CN | 109188927 A | 1/2019 |
| CN | 111369988 A | 7/2020 |
| CN | 111833862 A | 10/2020 |
| WO | 2008130095 A1 | 10/2008 |

OTHER PUBLICATIONS

Disclosed Anonymously, "Method and system for Head mounted AR device based classifying intentional and unintentional gesture signal generated from wearable device," IP.com No. IPCOM000262791D, IP.com Publication Date: Jun. 30, 2020, 5 pages.

Disclosed Anonymously, "Method and system for controlling augmented reality content with head and facial novement pattern," IP.com No. IPCOM00261616D, IP.com Publication Date: Mar. 20, 2020, 6 pages.

\* cited by examiner

CREATING A VIRTUAL CONTEXT FOR A VOICE COMMAND

BACKGROUND

The present invention relates to voice assistance systems, and more specifically, to creating virtual contexts for voice commands.

SUMMARY

According to an embodiment, a method includes determining a plurality of voice assistance systems located in a plurality of environments and receiving, from a headset of a user, a voice command from the user. The voice command lacks an identifier for a first voice assistance system of the plurality of voice assistance systems in a first environment of the plurality of environments. The method also includes predicting, based on the voice command, a subset of the plurality of voice assistance systems for executing the voice command and communicating, to the headset, images of environments of the plurality of environments in which the subset of the plurality of voice assistance systems are located. The method further includes detecting that the user selected, from the images, an image of the first environment that contains the first voice assistance system and in response to detecting that the user selected the image of the first environment, communicating the voice command to the first voice assistance system. Other embodiments include an apparatus for performing this method.

According to another embodiment, a method includes receiving, from a user, a voice command that lacks an identifier for a first voice assistance system of a plurality of voice assistance systems in a first environment of a plurality of environments and communicating the voice command to a command server. The method also includes receiving, from the command server, images of environments of the plurality of environments in which the plurality of voice assistance systems are located and presenting the images to the user. The method further includes detecting that the user selected, from the presented images, an image of the first environment that contains the first voice assistance system and indicating to the command server that the user selected the image so that the first voice assistance system executes the voice command. Other embodiments include an apparatus for performing this method.

DETAILED DESCRIPTION

Voice assistance systems perform voice commands issued by users. Voice assistance systems have grown so ubiquitous that many environments and spaces may include multiple voice assistance systems. For example, a user's home may contain different voice assistance systems that interface with different services and perform different functions. As another example, an office building may contain many different voice assistance systems owned by different employees. When a user issues a voice command in these environments, if the user does not vocally identify the voice assistance system to which the user is speaking, two undesired outcomes may result: (1) none of the voice assistance systems may perform the command or (2) multiple voice assistance systems may perform the command.

This disclosure describes a system that can determine the voice assistance system to which a user is issuing a voice command even if the user does not vocally identify the voice assistance system (e.g., by speaking "Hey, X," where X is a name of a voice assistance system). The system can predict a subset of voice assistance systems to which the user may be directing a voice command. The system then presents, on the user's headset (e.g., augmented reality glasses, an augmented reality headset, or a virtual reality headset), images of different environments in which the predicted voice assistance systems are located. The user may then select one of these images (e.g., by looking at the image or by speaking a name of a location represented by the image) and the system communicates the voice command to the voice assistance system in the selected location. The voice assistance system then performs the voice command. In this manner, the system allows a user to issue voice commands to a desired voice assistance system without vocally identifying the voice assistance system.

Figure 1:
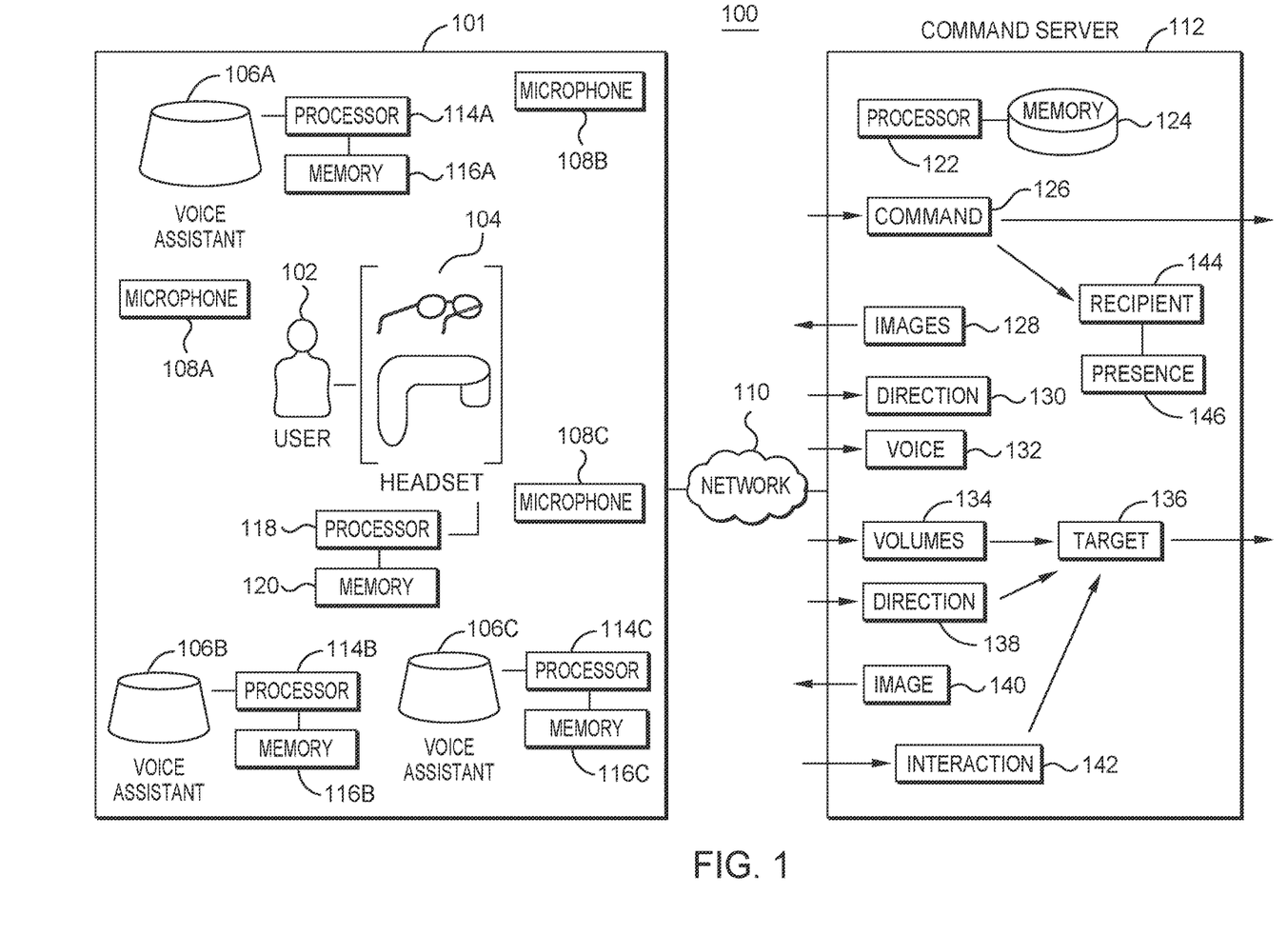
FIG. 1 illustrates an example system.

FIG. 1 illustrates an example system 100. As seen in FIG. 1, the system 100 includes a space 101, a network 110, and a command server 112. Generally, a user 102 in the space 101 may issue a command for one of several voice assistants in the space 101 without identifying that voice assistant. A device (e.g., an augmented reality headset or virtual reality headset of the user 102) detects the command and communicates the command to the command server 112. The command server 112 then predicts a number of voice assistants in the space 101 to which the command may be issued. The command server 112 then allows the user 102 to use the device to select an environment or voice assistant to which the command was directed. After the user 102 selects the environment or voice assistant, the command server 112 communicates the command to the selected voice assistant or to a voice assistant in the selected environment to execute the command. In this manner, the command server 112 may communicate the command to the appropriate voice assistant, even if the user 102 does not identify the voice assistant when issuing the command.

The space 101 may be any suitable space that contains multiple voice assistants 106. For example, the space 101 may be a home or an office building. The voice assistants 106 may be positioned in different environments within the space 101. For example, the voice assistants 106 may be positioned in different rooms of the home. As another example, the voice assistants 106 may be positioned in different offices of an office building. The voice assistants 106 may be identified using different names. When a user 102 issues a voice command, the user 102 may first identify the voice assistant 106 to which the user 102 intends to direct the voice command by saying "Hey, X," where X is the name of the voice assistant 106. If the user 102, however, does not identify the voice assistant 106 when issuing the voice command, the voice assistant 106 may not perform the command. As a result, if the user 102 has difficulty remembering the name of the voice assistant 106, then the user 102 may be unable to issue voice commands to the voice assistant 106. The system 100 uses a headset 104 of the user 102 and the command server 112 to identify the voice assistant 106, even when the user 102 does not identify the voice assistant 106 when issuing the command. In this manner, the system 100 allows the user 102 to issue commands to particular voice assistants 106 without identifying those voice assistants 106.

The headset 104 may present images to the user 102 using augmented reality or virtual reality. For example, the headset 104 may be augmented reality glasses or an augmented reality headset that overlays images onto the field of view of the user 102. As another example, the headset 104 may be a virtual reality headset that presents images to the user 102. The user 102 may wear the headset 104 to see the images overlaid or presented by the headset 104. As seen in FIG. 1, the headset 104 includes a processor 118 and a memory 120, which are configured to perform the actions or functions of the headset 104 described herein.

The processor 118 is any electronic circuitry, including, but not limited to one or a combination of microprocessors, microcontrollers, application specific integrated circuits (ASIC), application specific instruction set processor (ASIP), and/or state machines, that communicatively couples to memory 120 and controls the operation of the headset 104. The processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 118 may include other hardware that operates software to control and process information. The processor 118 executes software stored on the memory 120 to perform any of the functions described herein. The processor 118 controls the operation and administration of the headset 104 by processing information (e.g., information received from the command server 112, network 110, and memory 120). The processor 118 is not limited to a single processing device and may encompass multiple processing devices.

The memory 120 may store, either permanently or temporarily, data, operational software, or other information for the processor 118. The memory 120 may include any one or a combination of volatile or non-volatile local or remote devices suitable for storing information. For example, the memory 120 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 120, a disk, a CD, or a flash drive. In particular embodiments, the software may include an application executable by the processor 118 to perform one or more of the functions described herein.

Multiple voice assistants 106 are located in the space 101. The voice assistants 106 may be located in different environments within the space 101. For example, the voice assistants 106 may be located in different rooms or offices of the space 101. In the example of FIG. 1, the space 101 includes voice assistants 106A, 106B and 106C. Each of these voice assistants 106 may be located in different environments within the space 101. For example, if the space 101 is a home, then the voice assistant 106A may be located in the kitchen, the voice assistant 106B may be located in the living room, and the voice assistant 106C may be located in a bedroom. Each of these voice assistants 106 may be identified using a different name. When a command is issued to one of these voice assistants 106, the voice assistant 106 performs the command. For example, the voice assistant 106 may turn on or off appliances and lights within its respective space. As another example, the voice assistant 106 may play music or read messages. As seen in FIG. 1, each voice assistant 106 includes a processor 114 and a memory 116. The voice assistant 106A includes a processor 114A and a memory 116A. The voice assistant 106B includes a processor 114B and a memory 116B. The voice assistant 106C includes a processor 114C and a memory 116C. The processors 114 and the memory's 116 may be configured to perform any of the functions or actions of the voice assistants 106 described herein.

The processor 114 is any electronic circuitry, including, but not limited to one or a combination of microprocessors, microcontrollers, application specific integrated circuits (ASIC), application specific instruction set processor (ASIP), and/or state machines, that communicatively couples to memory 116 and controls the operation of the headset 104. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on the memory 116 to perform any of the functions described herein. The processor 114 controls the operation and administration of the headset 104 by processing information (e.g., information received from the command server 112, network 110, and memory 116). The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

The network 110 is any suitable network operable to facilitate communication between the components of the system 100. The network 110 may include any interconnecting system capable of transmitting audio, video, signals, data, messages, or any combination of the preceding. The network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The command server 112 determines the intended voice assistant 106 for a command issued by the user 102. The command server 112 then communicates the command to the intended voice assistant 106 so that the voice assistant 106 can perform the command. In this manner, the command server 112 allows a voice assistant 106 to perform a command issued by the user 102, even if the user 102 does not identify the voice assistant 106 when issuing the command in particular embodiments. As seen in FIG. 1, the command server 112 includes a processor 122 and a memory 124, which are configured to perform any of the functions or actions of the command server 112 described herein.

The processor 122 is any electronic circuitry, including, but not limited to one or a combination of microprocessors, microcontrollers, application specific integrated circuits (ASIC), application specific instruction set processor (ASIP), and/or state machines, that communicatively couples to memory 124 and controls the operation of the command server 112. The processor 122 may be 8-bit, 16-bit, 32-bit, 64-bit or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 122 may include other hardware that operates software to control and process information. The processor 122 executes software stored on the memory 124 to perform any of the functions described herein. The processor 122 controls the operation and administration of the command server 112 by processing information (e.g., information received from the headset 104, network 106, and memory 124). The processor 122 is not limited to a single processing device and may encompass multiple processing devices.

The memory 124 may store, either permanently or temporarily, data, operational software, or other information for the processor 122. The memory 124 may include any one or a combination of volatile or non-volatile local or remote devices suitable for storing information. For example, the memory 124 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 124, a disk, a CD, or a flash drive. In particular embodiments, the software may include an application executable by the processor 122 to perform one or more of the functions described herein.

The command server 112 receives a command 126 issued by the user 102. The user 102 may have spoken the command 126. In certain embodiments, the headset 104 may detect that the user 102 spoke the command 126 and communicate the command 126 to the command server 112. The user 102 may not have identified a voice assistant 106 when issuing the command 126. The command server 112 may analyze the command 126 and any other number of factors to predict voice assistants 106 in the space 101 to which the user 102 intended to direct the command 126. The command server 112 may analyze words within the command 126 to predict the voice assistants 106. For example, if the command 126 identifies functionality that can only be performed by certain voice assistants 106 in the space 101, then the command server 112 may predict that those voice assistants 106 are potential recipients of the command 126. As another example, if the command 126 identifies certain features or devices within particular environments of the space 101, then the command server 112 may predict that voice assistants 106 in those spaces are potential recipients of the command 126. Additionally or alternatively, the command server 112 may determine a geographical location of the user 102 using the location of the headset 104. Based on that determined location, the command server 112 may predict a set of voice assistants 106 that are the intended recipients of the command 126. For example, the headset 104 may communicate global positioning coordinates of the headset 104 or the user 102 to the command server 112. The command server 112 may use those coordinates to determine the voice assistants 106 that are closest to the user 102. The command server 112 may predict that these voice assistants 106 are potential recipients of the command 126.

After the command server 112 predicts the voice assistants 106 that may be the intended recipient of the command 126, the command server 112 communicates images 128 to the headset 104 of the user 102. The images 128 may be images of the predicted voice assistants 106 or environments in which the predicted voice assistants 106 are located. For example, if the command server 112 predicts that the voice assistants 106A and 106B may be the intended recipient of the command 126, the command server 112 may communicate images of the rooms in which the voice assistants 106A and 106B are located to the headset 104 of the user 102. The headset 104 then presents the images 128 to the user 102. If the headset 104 is an augmented reality headset or augmented reality glasses, the headset 104 overlays the images 128 onto the field of view of the user 102. As an example, if the voice assistant 106A is located in the kitchen and the voice assistant 106B is located in the living room, the command server 112 may communicate images of a kitchen and a living room to the headset 104. The headset 104 then presents the images of the kitchen and the living room to the user 102.

The user 102 then indicates a selection of one of the presented images 128. For example, the user 102 may look at one of the images 128. As another example, the user 102 may speak a name of a space shown in one of the images 128. The headset 104 may determine the image 128 that the user 102 selected and then communicate an indication of the selected image to the command server 112. In some embodiments, rather than communicating a selected image to the command server 112, the headset 104 determines a direction 130 of the eyes of the user 102. The user 104 may use eye tracking software or hardware to determine the direction 130 of the users 102 eyes. The headset 104 then communicates the direction 130 of the user's 102 eyes to the command server 112. The command server 112 analyzes the direction 130 to determine an image 128 at which the user 102 is looking. The command server 112 then determine that that image 128 is the image 128 selected by the user 102. In some embodiments, the user 102 speaks the selection of the image 128. For example, the user 102 may speak the name of a room shown in an image 128. The headset 104 detects the voice 132 of the user 102. The headset 104 then communicates the voice 132 to the command server 112. The command server 112 analyzes the voice 132 to determine the image 128 selected by the user 102. For example, the command server 112 may determine the name of a room spoken by the voice 132. The command server 112 then identifies an image 128 of a room identified by the voice 132. The command server 112 then determines that that image 128 was selected by the user 102.

After determining the image 128 selected by the user 102, the command server 112 determines a voice assistant 106 located in an environment shown in the selected image 128. The command server 112 then communicates the command 126 to that voice assistant 106. The voice assistant 106 then performs the command 126. In this manner, the command server 112 identifies the voice assistant 106 to perform the command 126, even though the user 102 did not identify the voice assistant 106 when issuing the command 126.

Certain commands 126 may include a target. For example, the user 102 may issue a command 126 turn off the lights. In that command 126, the target is particular lights within an environment of the space 101. As another example, the user 102 may issue a command to water the plant. In that command 126, the target is the plant. The command server 112 may analyze information from the space 101 to determine the target 136 of the command 126. In some embodiments, the command server 112 analyzes information from one or more microphones 108 positioned in the space 101 to determine the target 136. The microphones 108 may be directional microphones that can determine a volume 134 of the voice of the user 102. Using the volumes 134 detected by the microphones 108 in the space 101, the command server 112 identifies the target 136 of the command 126. Using the example of FIG. 1, the space 101 includes the microphones 108A, 108B, and 108C positioned at different locations within the space 101. The user 102 may be closer to the microphone 108A than the microphones 108B and 108C. When the user 102 speaks the command 126, the microphone 108A may detect a volume 134 that is higher than the detected volumes of the microphones 108B and 108C. The command server 112 compares the volumes 134 detected by the different microphones 108A, 108B and 108C to determine a directionality of the user's 102 voice. The command server 112 uses that directionality to determine a target 136 of the command 126. For example, the command server 112 may determine, based on the volumes 134, that the user 102 is directing the command 126 or the voice of the user 102 towards a particular light when speaking the command 126 "turn off the light." In response, the command server 112 determines that the target 136 of the command 126 is the light towards which the user 102 is directing their voice.

In some embodiments, the command server 112 determines the target 136 of the command 126 based on the direction of the user's 102 eyes. The headset 104 uses eye tracking software and hardware to determine a direction 138 of the user's 102 eyes. The headset 104 communicates the direction 138 to the command server 112. The command server 112 analyzes the direction 138 (along with other information, e.g., coordinates of the user's 102 location) to determine a target 136 of the command 126. For example, the headset 104 may determine that the user 102 is looking in a particular direction when issuing the command 126. The headset 104 communicates that direction 138 to the command server 112. The command server 112 analyzes that direction 138 along with coordinates representing the user's 102 location to determine an object at which the user 102 is looking. The command server 112 may determine that that object is the target 136 of the command 126. For example, based on the direction 138, the command server 112 may determine that the user 102 is looking at a particular light when issuing the command 126 "turn off the light." As another example, the command server 112 may determine, based on the direction 138, that the user 102 is looking at a particular plant when issuing the command 126 "water the plant."

In some embodiments, the command server 112 communicates an image 140 to the headset 104 of the user 102. The user 102 may perform an interaction corresponding to that image 140. The headset 104 detects that interaction and communicate the interaction 142 to the command server 112. The command server 112 may determine the target 136 of the command 126 based on the interaction 142 performed by the user 102. For example, if the user 102 issues the command 126 "water the plant," the command server 112 may communicate an image 130 of a watering can to the headset 104. The headset 104 then overlays the image of the watering can onto the field of view of the user 102. The user 102 may then move their head to position the image 140 of the watering can onto a particular plant. The headset 104 may detect this movement and the position of the watering can on the particular plant and communicate this information as the interaction 142 to the command server 112. The command server 112 may then analyze the interaction 142 to determine that the plant is the target 136 of the command 126.

After the command server 112 determines the target 136 of the command 126, the command server 112 communicates the target 136 to the voice assistant 106 that was determined as the intended recipient of the command 126. The voice assistant 106 may then perform the command 126 on the target 136. For example, if the user 102 issued the command 126 "turn off the light," the voice assistant 106 may turn off the particular light determined to be the target 136 of the command 126. As another example, if the user 102 issues the command 126 "water the plant," the voice assistant 106 waters the plant that was determined to be the target 136 of the command 126.

In some embodiments, the command 126 has an intended recipient 144 that is different from the voice assistant 106. For example, the user 102 may issue a command 126 intended for a family member or caretaker. The command server 112 analyzes the command 126 to determine the intended recipient 144. For example, the user 102 may speak a name or role of the intended recipient 144 when issuing the command 126. The command server 112 uses the name or role to determine the recipient 144. The command server 112 then records the command 126 and the intended recipient 144. When a voice assistant 106 or the headset 104 subsequently detects a presence 146 of the recipient 144, the voice assistant 106 or the headset 104 may alert the command server 112. For example, the voice assistant 106 may detect the presence 146 of the recipient 144 by detecting a voice of the recipient 144 or by detecting an image of the recipient 144 taken by a security camera. The voice assistant 106 then communicates an indication of the presence 146 of the recipient 144 to the command server 112. The command server 112 then retrieves the command 126 that was intended for the recipient 144 and communicate the command 126 to the voice assistant 106 or the headset 104. The voice assistant 106 and the headset 104 then play the command 126 for the recipient 144. In this manner, the user 102 and the command server 112 may present commands 126 for the recipient 144, and then issue those commands 126 when the recipient 144 is present.

Figure 2:
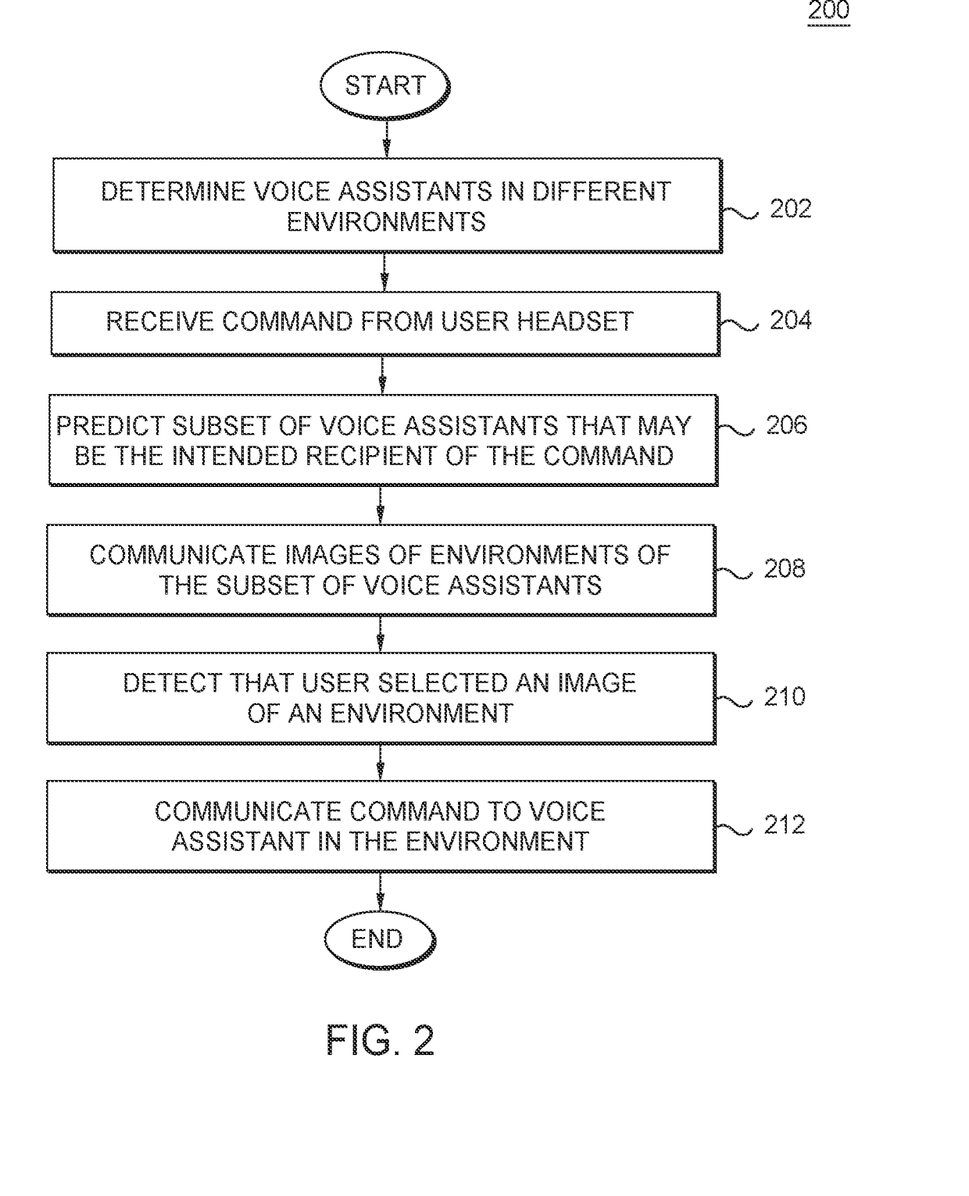
FIG. 2 is a flowchart of an example method in the system of FIG. 1.

FIG. 2 is a flowchart of an example method 200 in the system 100 of FIG. 1. The command server 112 may perform the method 200. In particular embodiments, by performing the method 200, the command server 112 identifies a voice assistant 106 as the intended recipient of a command 126, even though a user 102 does not identify the voice assistant 106 when issuing the command 126.

In block 202, the command server 112 determines voice assistants 106 in different environments of a space 101. For example, if the space 101 is a house, then the voice assistants 106 may be positioned in different rooms of the house. As another example, if the space 101 is an office complex, then the voice assistants 106 may be positioned in different offices of the complex. The command server 112 may determine the identities of these voice assistants 106 and their respective locations within the space 101 through user input. For example, when the user 102 is setting up or installing each voice assistant 106, messages may be communicated to the command server 112 to identify the voice assistant 106 and to indicate the location of the voice assistant 106. The command server 112 tracks the identities and locations of the voice assistants 106 in the space 101.

The command server 112 then receives a command 126 from a user headset 104 in block 204. A user 102 may have spoken the command 126. The headset 104 may have detected that the user 102 spoke the command 126. The headset 104 then communicates the command 126 to the command server 112. The user 102 may not have identified a voice assistant 106 to which the user 102 intended to issue the command 126. For example, the user 102 may issue the command "turn off the light" or "water the plant" but not identify the voice assistant 106 that the user 102 intends to carry out the command 126.

In block 206, the command server 112 predicts a subset of the voice assistants 106 in the space 101 that may be the intended recipient of the command 126. The command server 112 may predict the subset of the voice assistants 106 using different information. For example, the command server 112 may analyze the words of the command 126 to identify certain functionality requested by the command 126. The command server 112 then identifies the subset of voice assistants 106 that are capable of performing the requested function. As another example, the command server 112 may analyze the words of the command 126 to determine certain objects or devices identified within the command 126. The command server 112 then predicts the subset of voice assistants 106 that are related to or positioned close to those objects or devices. As yet another example, the command server 112 may determine a location of the user 102 (e.g., coordinates representing the location of the user 102) when the user 102 issued the command 126. The command server 112 then predicts the subset of voice assistants 106 that are closest to the location of the user 102.

In block 208, the command server 112 communicates, to the headset 104 of the user 102, images 128 of environments in which the subset of voice assistants 106 are located. The headset 104 then presents the images 128 to the user 102. For example, the headset 104 may overlay the images 128 onto the field of view of the user 102. In block 210, the command server 112 detects that the user 102 selected an image 128 of an environment. In particular embodiments, the command server 112 determines that the user selected an image 128 based on a direction 130 of the user's 102 eyes detected by the headset 104. The command server 112 analyzes the direction 130 in which the user 102 is looking to determine that the user 102 is looking at an image 128 being presented to the user 102. The command server 112 then determines that that image 128 is the image that the user 102 is selecting. In some embodiments, the command server 112 determines the image 128 selected by the user 102 based on a voice 132 detected by the headset 104. For example, the user 102 may speak the name of an environment in an image 128 that is shown presented on the headset 104. The headset 104 communicates the voice 132 of the user 102 to the command server 112. The command server 112 analyzes the voice 132 to determine the environment spoken by the user 102. The command server 112 then identifies the image 128 showing that environment as the image 128 selected by the user 102.

In block 212, the command server 112 communicates the command 126 to a voice assistant 106 in the environment shown in the selected image 128. The voice assistant 106 then receives the command 126 and performs the command 126. In this manner, the command server 112 identifies the voice assistant 106 to which the user 102 intended to issue the command 126 even though the user 102 did not identify the voice assistant 106 when issuing the command 126.

Figure 3:
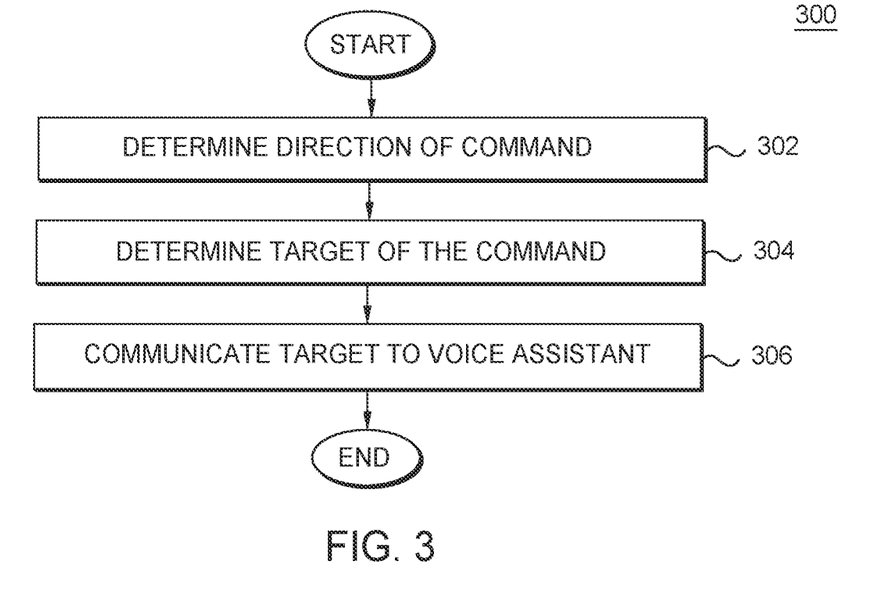
FIG. 3 is a flowchart of an example method in the system of FIG. 1.

FIG. 3 is a flowchart of an example method 300 in the system 100 of FIG. 1. The command server 112 performs the method 300. In particular embodiments, by performing the method 300, the command server 112 identifies a target 136 of a command 126 based on the direction of a user's 102 voice.

In block 302, the command server 112 determines a direction of a command 126. In certain embodiments, the command server 112 determines the direction of the command 126 based on volumes 134 communicated by one or more microphones 108 positioned within a space 101. The microphones 108 may be directional microphones 108. When the user 102 issues the command 126, the microphones 108 determine the voice of the user 102. The microphones 108 communicate the detected volumes 134 of the voice of the user 102 to the command server 112. Microphones 108 that are closer to the user 102 may detect a higher volume 134 than microphones 108 that are further away from the user 102. The command server 112 analyzes the detected volumes 134 to determine a directionality of the user's 102 voice when issuing the command 126.

In block 304, the command server 112 determines a target 136 of the command 126 based on the directionality of the user's 102 voice. For example, the command server 112 may determine that the user 102 is directing their voice towards a particular light when issuing the command "turn off the light." As another example, the command server 112 may determine that user 102 is directing their voice towards a particular plant when issuing the command "water the plant." In block 306, the command server 112 communicates the target 136 to the voice assistant 106 to which the user 102 intended to issue the command 126. The voice assistant 106 then performs the command 126 on the target 136.

Figure 4:
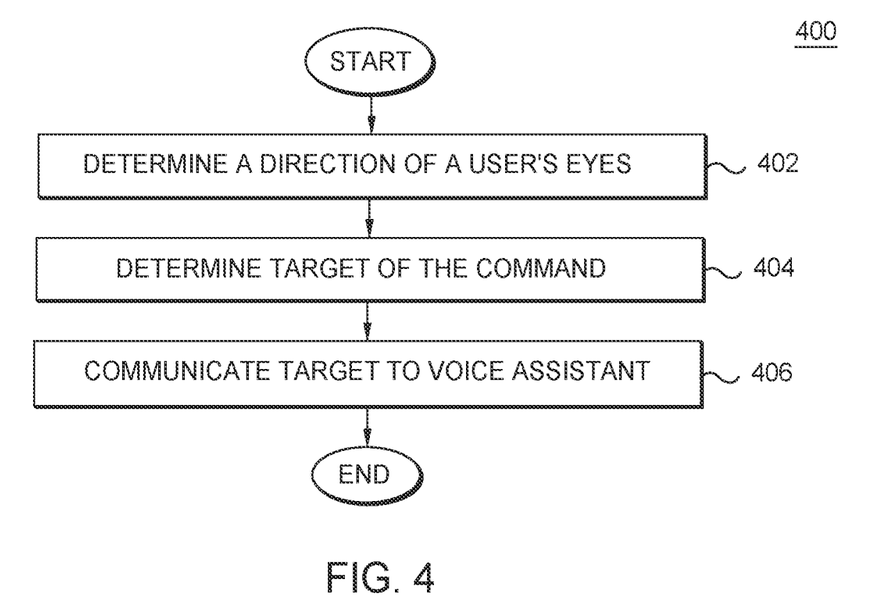
FIG. 4 is a flowchart of an example method in the system of FIG. 1.

FIG. 4 is a flowchart of an example method 400 in the system 100 of FIG. 1. The command server 112 performs the method 400. In particular embodiments, by performing the method 400, the command server 112 determines a target 136 of a command 126 based on a direction of the eyes of a user 102.

In block 402, the command server 112 determines a direction of a user's 102 eyes. The command server 112 may determine the direction of the eyes based on information from a headset 104 worn by the user 102. The headset 104 may use eye tracking software and hardware to track the movement of the eyes of the user 102. The headset 104 then communicates the direction 138 of the eyes of the user 102 to the command server 112.

In block 404, the command server 112 determines the target 136 of the command 126 based on the direction 138 of the eyes of the user 102. For example, the command server 112 may determine, based on the direction 138 of the eyes of the user 102, that the user 102 is looking at a particular object when issuing the command 126. The command server 112 then determines that that object is the target 136 of the command 126. As an example, the command server 112 may determine that the user 102 was looking at a particular light when issuing the command "turn off the light." As another example, the command server 112 may determine that the user 102 was looking at a particular plant when issuing the command "water the plant." In some embodiments, the command server 112 may use other information in combination with the direction 138 of the user's 102 eyes to determine the target 136. For example, the command server 112 may determine the target 136 based on the direction 138 of the user's 102 eyes and coordinates representing the geographical location of the user 102.

In block 406, the command server 112 communicates the target 136 to the voice assistant 106 to which the user 102 intended to issue the command 126. The voice assistant 106 then performs the command 126 on the target 136.

Figure 5:
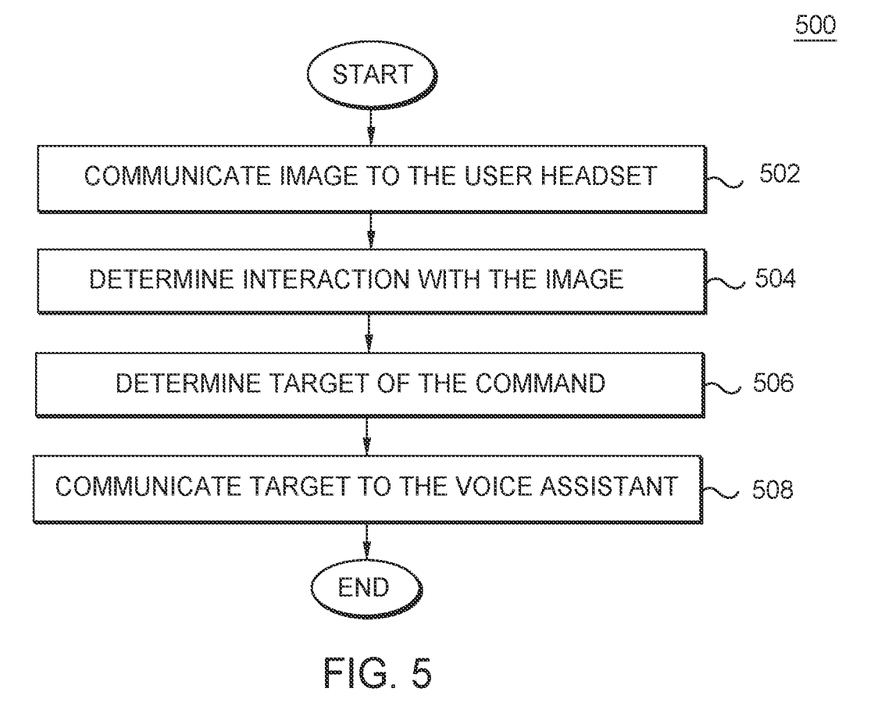
FIG. 5 is a flowchart of an example method in the system of FIG. 1.

FIG. 5 is a flowchart of an example method 500 in the system 100 of FIG. 1. The command server 112 performs the method 500. In particular embodiments, by performing the method 500, the command server 112 determines the target 136 of a command 126.

In block 502, the command server 112 communicates an image 140 to the headset 104 of the user 102. The image 140 may be generated based on the command 126 issued by the user 102. For example, if the user 102 issues the command "turn off the light," the image 140 may be an image of a light switch. As another example, if the user 102 issues the command 126 "water the plant," the image 140 may be an image of a watering can. The headset 104 presents the image 140 to the user 102. For example, the headset 104 may overlay the image 140 onto the field of view of the user 102.

In block 504, the command server 112 determines an interaction 142 with the image 140. The user 102 may have performed the interaction 142 using the image 140. For example, if the image 140 is of a light switch, the user 102 may have used a finger to flip the light switch when looking in a particular direction to position the light switch on a particular light. As another example, the user 102 may have looked in a particular direction to position an image 140 of a watering can onto a particular plant. The headset 104 detects these interactions 142 and communicate these interactions 142 to the command server 112.

In block 506, the command server 112 determines the target 136 of the command 126 based on the interaction 142. If the user 102 looked in a particular direction to position the image 140 on a particular object, the command server 112 may determine that that object is the target 136 of the command 126. For example, if the user 102 looked in a particular direction to position of the image 140 of the light switch on a particular light or the image 140 of a watering can on a particular plant, then the command server 112 may determine that that light or that plant is the target 136 of the command 126.

In block 508, the command server 112 communicates the target 136 to the voice assistant 106 to which the user 102 intended to issue the command 126. The voice assistant 106 then performs the command 126 on the target 136.

Figure 6:
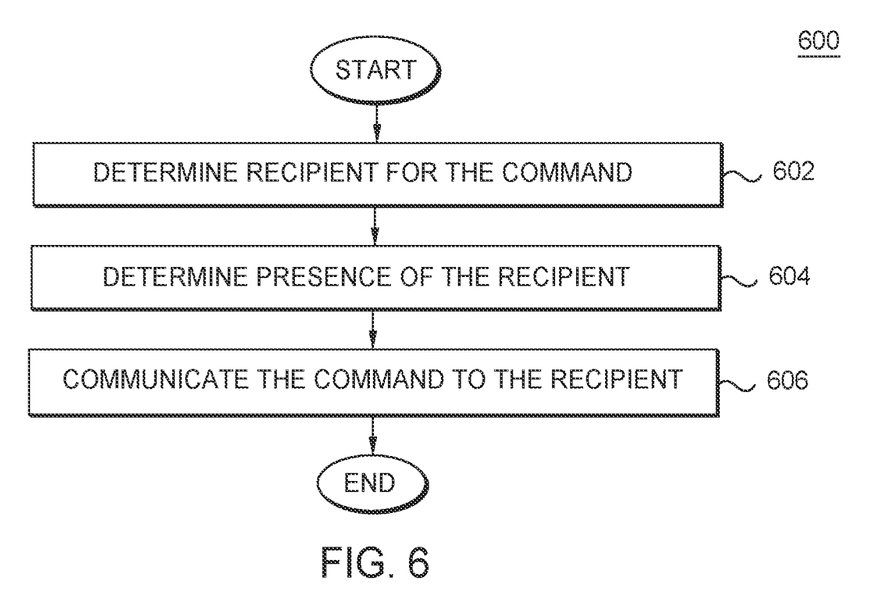
FIG. 6 is a flowchart of an example method in the system of FIG. 1.

FIG. 6 is a flowchart of an example method 600 in the system 100 of FIG. 1. The command server 112 performs the method 600. In certain embodiments, by performing the method 600, the command server 112 stores and presents commands 126 based on a detected presence 146 of an intended recipient 144.

In block 602, the command server 112 determines an intended recipient 144 for a command 126. For example, the command 126 may identify the intended recipient 144. The command server 112 analyzes the words of the command 126 to identify the intended recipient 144. The intended recipient 144 is different from the voice assistants 106 in the space 101. For example, the recipient 144 may be a family member or a caretaker. The command server 112 stores the command 126 and the intended recipient 144 for a later time.

In block 604, the command server 112 determines a presence 146 of the intended recipient 144. For example, the voice assistant 106 may detect a voice of the intended recipient 144. As another example, the headset 104 may include a camera that sees the intended recipient 144. The voice assistant 106 or the headset 104 then communicate the presence 146 of the intended recipient 144 to the command server 112. The command server 112 then detects the presence 146 of the intended recipient 144.

In block 606, the command server 112 communicates the command 126 to the recipient 144 in response to detecting the presence 146 of the recipient 144. For example, the command server 112 may communicate the command 126 to a voice assistant 106 that is closest to the recipient 144. The voice assistant 106 then speaks the command 126 to the recipient 144 to let the recipient 144 know that the recipient 144 should perform the command 126. In this manner, the user 102 can store commands 126 for an intended recipient 144 when the recipient 144 shows up at a later time. For example, the user 102 can store the command 126 "refill the pet bowl" or "take out the trash." When the intended recipient 144 arrives at the user's 102 home, the voice assistant 106 speaks the command 126 to remind the recipient to perform the command 126.

Figure 7:
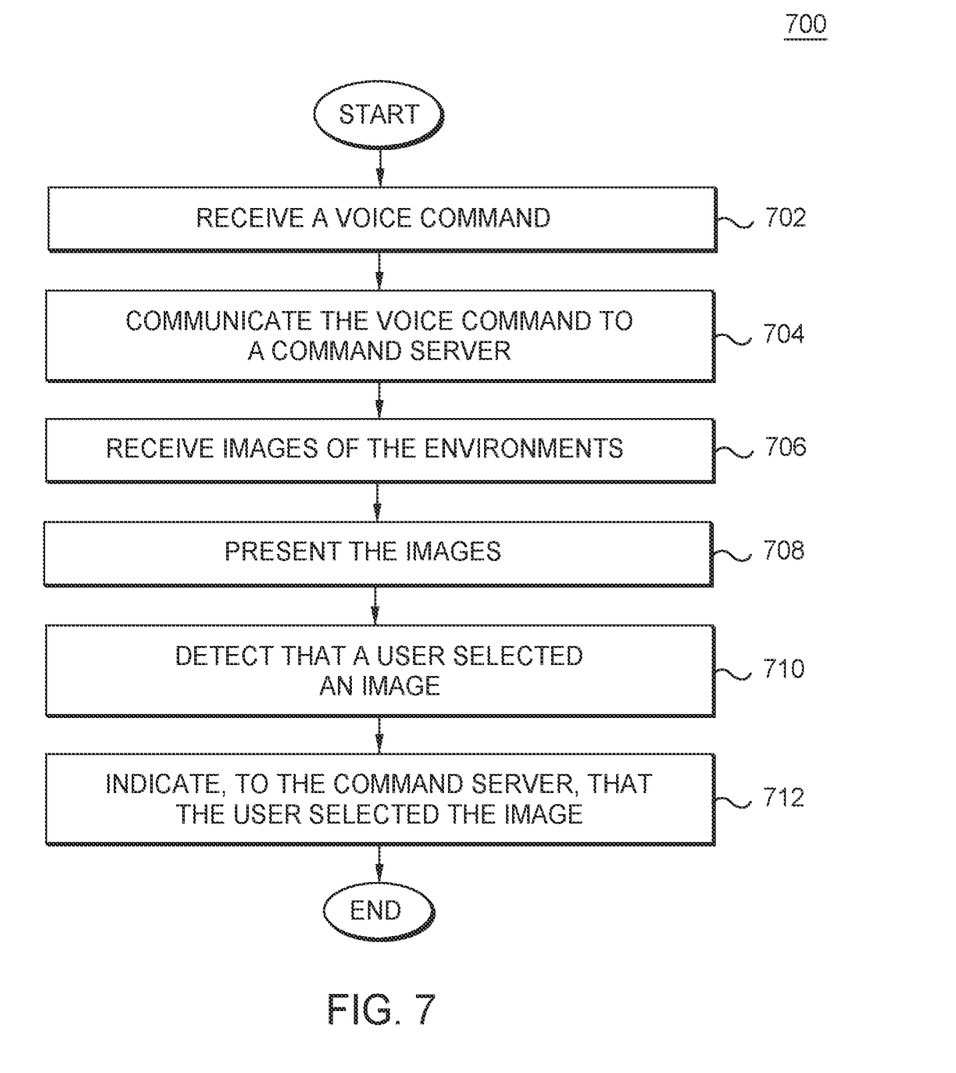
FIG. 7 is a flowchart of an example method in the system of FIG. 1.

FIG. 7 is a flowchart of an example method 700 in the system 100 of FIG. 1. The headset 104 performs the method 700. In particular embodiments, by performing the method 700, the headset 104 allows a command 126 to be performed by a voice assistant 106, even if a user 102 does not identify the voice assistant 106 when issuing the command 126.

In block 702, the headset 104 receives a voice command 126 spoken by a user 102. The headset 104 may include microphones that detect the voice of the user 102. When the user 102 speaks the voice command 126, the headset 104 detects that the user 102 spoke the voice command 126. The user 102 may not have identified a voice assistant 106 when issuing the command 126.

In block 704, the headset 104 communicates the voice command 126 to a command server 112. The command server 112 then analyzes the command 126 to predict a subset of voice assistants 106 to which the user 102 may have intended to issue the command 126. The command server 112 then communicates, to the headset 104, images 128 of environments in which the predicted voice assistants 106 are located. In block 706, the headset 104 receives the images 128 of the environment. In block 708, the headset 104 presents the images 128 to the user 102. For example, the headset 104 may overlay the images 128 onto a field of view of the user 102.

In block 710, the headset 104 detects that the user 102 selected an image 128. For example, the headset 104 may use eye tracking software or hardware to determine that the user 102 is looking at a particular image 128 being presented to the user 102 on the headset 104. As another example, the headset 104 may include a microphone that detects the user 102 speaking the name of an environment shown in one of the images 128. In block 712, the headset 104 indicates to the command server 112 that the user 102 selected the image 128. For example, the headset 104 may communicate the direction 130 of the user's 102 eyes to the command server 112. The command server 112 determines, based on the direction 130, the image that the user 102 selected. As another example, the headset 104 may communicate the voice 132 of the user 102 to the command server 112. The command server 112 determines, based on the voice 132, the image that the user 102 selected.

This disclosure describes a system 100 that can determine the voice assistance system to which a user 102 is issuing a voice command 126, even if the user 102 does not vocally identify the voice assistance system (e.g., by speaking "Hey, X," where X is a name of a voice assistance system). The system 100 can predict a subset of voice assistance systems to which the user 102 may be directing a voice command 126. The system 100 then presents, on the user's 102 headset 104 (e.g., augmented reality glasses, an augmented reality headset, or a virtual reality headset), images 128 of different environments in which the predicted voice assistance systems are located. The user 102 may then select one of these images 128 (e.g., by looking at the image 128 or by speaking a name of a location represented by the image 128) and the system 100 communicates the voice command 126 to the voice assistance system in the selected location. The voice assistance system then performs the voice command 126. In this manner, the system 100 allows a user 102 to issue voice commands 126 to a desired voice assistance system without vocally identifying the voice assistance system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments.

Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the command server 112) or related data available in the cloud. For example, the command server 112 could execute on a computing system in the cloud to determine the voice assistant 106 for a command 126. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   determining a plurality of voice assistance systems located in a plurality of environments;
   receiving, from a headset of a user, a voice command from the user, wherein the voice command lacks an identifier for a first voice assistance system of the plurality of voice assistance systems in a first environment of the plurality of environments;
   predicting, based on the voice command, a subset of the plurality of voice assistance systems for executing the voice command;
   communicating, to the headset, images of environments of the plurality of environments in which the subset of the plurality of voice assistance systems are located;
   detecting that the user selected, from the images, an image of the first environment that contains the first voice assistance system; and
   in response to detecting that the user selected the image of the first environment, communicating the voice command to the first voice assistance system.

2. The method of claim 1, further comprising:
   determining, based on a plurality of microphones positioned in the first environment, a direction of the voice command;
   determining, based on the direction, a target of the voice command; and
   communicating the target of the voice command to the first voice assistance system to execute the voice command on the target.

3. The method of claim 2, wherein the direction is determined based on a volume of the voice command detected by each microphone of the plurality of microphones.

4. The method of claim 1, further comprising:
detecting a direction of eyes of the user;
determining, based on the direction of the eyes of the user, a target of the voice command; and
communicating the target of the voice command to the first voice assistance system to execute the voice command on the target.

5. The method of claim 1, further comprising:
communicating, to the headset, an image corresponding to the voice command; and
determining, based on an interaction by the user with the image corresponding to the voice command, a target of the voice command; and
communicating, to the first voice assistance system, the target to execute the voice command on the target.

6. The method of claim 1, further comprising determining a geographic location of the user, wherein predicting a subset of the plurality of voice assistance systems is further based on the geographic location.

7. The method of claim 1, further comprising:
determining a recipient for the voice command different from the user;
detecting a presence of the recipient; and
communicating the voice command to the recipient in response to detecting the presence of the recipient.

8. An apparatus comprising:
a memory; and
a hardware processor communicatively coupled to the memory, the hardware processor configured to:
determine a plurality of voice assistance systems located in a plurality of environments;
receive, from a headset of a user, a voice command from the user, wherein the voice command lacks an identifier for a first voice assistance system of the plurality of voice assistance systems in a first environment of the plurality of environments;
predict, based on the voice command, a subset of the plurality of voice assistance systems for executing the voice command;
communicate, to the headset, images of environments of the plurality of environments in which the subset of the plurality of voice assistance systems are located;
detect that the user selected, from the images, an image of the first environment that contains the first voice assistance system; and
in response to detecting that the user selected the image of the first environment, communicate the voice command to the first voice assistance system.

9. The apparatus of claim 8, the hardware processor further configured to:
determine, based on a plurality of microphones positioned in the first environment, a direction of the voice command;
determine, based on the direction, a target of the voice command; and
communicate the target of the voice command to the first voice assistance system to execute the voice command on the target.

10. The apparatus of claim 9, wherein the direction is determined based on a volume of the voice command detected by each microphone of the plurality of microphones.

11. The apparatus of claim 8, the hardware processor further configured to:
detect a direction of eyes of the user;
determine, based on the direction of the eyes of the user, a target of the voice command; and
communicate the target of the voice command to the first voice assistance system to execute the voice command on the target.

12. The apparatus of claim 8, the hardware processor further configured to:
communicate, to the headset, an image corresponding to the voice command; and
determine, based on an interaction by the user with the image corresponding to the voice command, a target of the voice command; and
communicate, to the first voice assistance system, the target to execute the voice command on the target.

13. The apparatus of claim 8, the hardware processor further configured to determine a geographic location of the user, wherein predicting a subset of the plurality of voice assistance systems is further based on the geographic location.

14. The apparatus of claim 8, the hardware processor further configured to:
determine a recipient for the voice command different from the user;
detect a presence of the recipient; and
communicate the voice command to the recipient in response to detecting the presence of the recipient.

15. A method comprising:
receiving, from a user, a voice command that lacks an identifier for a first voice assistance system of a plurality of voice assistance systems in a first environment of a plurality of environments;
communicating the voice command to a command server;
receiving, from the command server, images of environments of the plurality of environments in which the plurality of voice assistance systems are located;
presenting the images to the user;
detecting that the user selected, from the presented images, an image of the first environment that contains the first voice assistance system; and
indicating to the command server that the user selected the image so that the first voice assistance system executes the voice command.

16. The method of claim 15, wherein detecting that the user selected the image comprises:
detecting a direction of eyes of the user; and
determining, based on the direction of the eyes of the user, the image from the presented images.

17. The method of claim 15, wherein detecting that the user selected the image comprises:
detecting a second voice command indicating the first environment; and
determining, based on the second voice command, the image from the presented images.

18. The method of claim 15, further comprising:
presenting an image corresponding to the voice command; and
determining an interaction by the user with the image; and
communicating, to the command server, the interaction.

19. The method of claim 15, further comprising:
determining a geographic location of the user; and
communicating the geographic location of the user to the command server.

20. The method of claim 15, further comprising:
detecting a presence of a recipient for the voice command different from the user; and
communicating, to the command server, an indication of the presence of the recipient.

* * * * *